United States Patent Office 3,644,452
Patented Feb. 22, 1972

3,644,452
METHOD OF MAKING ORGANOLEAD-SILICON COMPOUNDS
Kenneth C. Williams, Baton Rouge, La., assignor to Ethyl Corporation, New York, N.Y.
No Drawing. Filed Nov. 21, 1969, Ser. No. 878,877
Int. Cl. C07f 7/24
U.S. Cl. 260—437 R         17 Claims

ABSTRACT OF THE DISCLOSURE

A method of making organolead-silicon compounds wherein an organosilicon Grignard reagent is reacted with a lead halide to form an intermediate organolead-silicon-magnesium halide and said complex halide is then reacted with a hydrocarbon or organohalide to form an organolead-silicon compound.

BACKGROUND OF THE INVENTION

Field of the invention

The present invention is concerned with the synthesis of organolead-silicon compounds.

Description of the prior art

It has been previously reported that tetrakis(trimethylsilylmethyl) lead can be prepared by reacting trimethylsilylmethylmagnesium chloride with lead chloride in tetrahydrofuran (THF) with yields up to 37%. This reaction may be summarized as follows:

$$4(CH_3)_3SiCH_2MgCl + 2PbCl_2 \xrightarrow{THF}$$
$$[(CH_3)_3SiCH_2]_4Pb + Pb + 4MgCl_2$$

In the foregoing reaction when the lead chloride was added to the Grignard reagent in tetrahydrofuran at $-10°$ C., the solution became deep red-brown in color. Previous work in the preparation of trialkylplumbyl-magnesium chloride complexes produced a dark greenish-brown color in tetrahydrofuran solution.

SUMMARY OF THE INVENTION

The present invention relates broadly to a two-step process for preparing organolead-silicon compounds primarily for use as antiknock and emission control additives for gasoline to be burned or used as fuel in internal combustion engines. In the first step of the method, an organosilicon Grignard reagent is reacted with a lead halide or a lead carboxylate in the presence of a solvent to form a complex organosilylplumbyl halide intermediate. In the second step of the reaction, the complex intermediate is reacted with an organo halide in the presence of a solvent to produce the organolead-silicon compound.

The invention is illustrated by the following equations:

(1) $3R_3SiCH_2MgX + PbX'_2 \rightarrow$
$\qquad (R_3SiCH_2)_3PbMgX + MgX'_2 + MgX_2$ (2) $(R_3SiCH_2)_3PbMgX + RX \rightarrow (R_3SiCH_2)_3PbR + MgX_2$ R=H, alkyl, or aryl
X=halogen
X'=halogen, or carboxylate

DESCRIPTION OF THE PREFERRED EMBODIMENT

In one preferred method of the invention, three moles of trimethylsilylmethylmagnesium chloride (Grignard reagent) is reacted with one mole of lead chloride at 5° C. in tetrahydrofuran resulting in a dark reddish-brown, homogeneous solution which contains tris(trimethylsilylmethyl)plumbylmagnesium chloride.

Although not wishing to be bound by any particular theory, the reactions which probably occur in the preparation of the organometallic compound are as follows:

$$2(CH_3)_3SiCH_2MgCl + PbCl_2 \xrightarrow{THF} [(CH_3)_3SiCH_2]_2Pb + 2MgCl_2$$

$$[(CH_3)_3ZiCH_2]_2Pb + (CH_3)_3SiCH_2MgCl \xrightarrow{THF}$$
$$[(CH_3)_3SiCH_2]_3PbMgCl$$

Tetrahydrofuran solutions of the complex appear to be more stable than solutions of trimethylplumbylmagnesium chloride and triethylplumbylmagnesium chloride.

The complex or intermediate is then reacted with methyl chloride at 5° C. in tetrahydrofuran to form tris-(trimethylsilylmethyl)methyl lead. This reaction is illustrated by the following equation:

$$[(CH_3)_3SiCH_2]_3PbMgCl + CH_3Cl \xrightarrow{THF}$$
$$[(CH_3)_3SiCH_2]_3CH_3Pb + MgCl$$

The reactions are preferably performed at a temperature of about 5° C., with a range of from about $-20°$ C. to about 50° C. producing good results.

In addition to tetrahydrofuran, other solvents which may be used include ethers, cyclic ethers, glycolic ethers and alkyl amines.

Some examples of suitable solvents are alkyl ethers, e.g., diethyl ether, methylethyl ether, diisopropyl ether, dibutyl ether, di-n-butyl ether, dihexyl ether; cyclic ethers, e.g., tetrahydrofuran, 1,4-dioxane, ethyl ether of methyl tetrahydrofuran, tetrahydrofurfurylethyl ether, 3-ethyl tetrahydrofuran, 2-(o-toloxy)tetrahydrofuran, N-methyl morpholine, tetrahydrofurfurylmethyl ether, e-phenoxytetrahydrofuran, 4-ethoxytetrahydrofuran, 2,5-dihydrofuran, tetrahydropyran, 4 - methoxy - tetrahydropyran, 2-ethoxytetrahydropyran; and glycolic ethers, e.g., diethyl ether of diethylene glycol, triethylene glycol, tetraethylene glycol, diethyl ether of ethylene glycol, dibutyl ether of ethylene glycol, dimethyl ether of diethylene glycol, dipropyl ether of diethylene glycol, methyl ethyl ether of ethylene glycol, dibutyl ether of diethylene glycol, dihexyl ether of ethylene glycol, cyclohexyl ethyl diether of diethylene glycol, phenyl ethyl diether of ethylene glycol, mixture thereof and the like.

Other suitable solvents are cycloalkalene mono-ethers having the following formula:

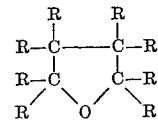

wherein, R=hydrogen, an alkyl group having from 1–10 carbon atoms, or an aryl group.

Additional suitable solvents are amines such as trimethyl amine, triethyl amine and the like. Hexamethyl phosphoramide is also suitable.

In general, solvents more basic than diethyl ether are preferred, with tetrahydrofuran being especially preferred.

A number of organolead silicon compounds were prepared as described hereinafter. All reactions were carried out under a nitrogen atmosphere. Tetrahydrofuran (THF) was distilled from lithium aluminum hydride before use. Lead chloride was obtained from Fisher Scientific Company and used without purification. Molecular weights were determined by the differential vapor pressure technique in benzene solution at 37° C. using a Mechrolab Model 302 vapor pressure osmometer. Because of insolubility in benzene, the molecular weight of tris(trimethylsilylmethyl)lead chloride was measured in THF.

The reactions were performed in a 1000 ml., three-necked, round-bottom flask equipped with a condenser (Dewar filled with Dry Ice-acetone) and magnetic or paddle stirrer. The lead salt was added from a 50 ml., round-bottom flask connected to the reaction vessel by a short piece of Gooch tubing. The Grignard reagents were prepared from magnesium turnings and a slight excess of the alkyl halide. The excess alkyl halide was then removed by heating at reflux for a few minutes under a nitrogen flush.

Lead contents of the new organolead derivatives were determined by reaction with bromine in carbon tetrachloride, destruction with nitric and perchloric acid and titration with ethylenediaminetetraacetic acid to the endpoint using xylenol orange as indicator. During the hydrolysis of the reaction mixtures enough dilute HCl was added to solubilize the precipitated magnesium salts.

EXAMPLE I

Tris(trimethylsilylmethyl)plumbylmagnesium chloride

The Grignard reagent, prepared from 8.0 g. (0.33 g.-atom) of magnesium and 41 g. (0.33 mole) of chloromethyltrimethylsilane in 450 ml. of tetrahydrofuran, was cooled to 5° C., and 27.8 g. (0.1 mole) of lead chloride was added slowly over a 15-minute period. A dark reddish-brown and homogeneous solution was obtained. The complex was characterized by several derivatives as described in the examples hereinafter.

EXAMPLE II

Tetrakis(trimethylsilylmethyl)lead

Tris(trimethylsilylmethyl)plumbylmagnesium chloride was prepared as described in Example I from 27.8 g. (0.1 mole) of lead chloride and trimethylsilylmethylmagnesium chloride in 450 ml. of THF. To this solution was added 12.4 g. (0.1 mole) of chloromethyltrimethylsilane at 5° C. The ice bath was removed and the solution was allowed to warm to ambient temperature. After stirring for one hour the reddish-brown color disappeared and a gelatinous precipitate was formed. No lead metal was observed. The mixture was hydrolyzed with 300 ml. of water and the THF was removed by distillation at atmospheric pressure. After removal of the THF the product separated as a colorless layer below the aqueous layer. The product was separated and washed several times with water to remove all traces of THF. All of the volatile impurities were steam distilled from the product. It was then dried by filtering through a bed of calcium chloride. After drying 45.6 g. (81.0%) of the colorless product was obtained. When completely dry the material crystallized and melted at 24–25° C.

*Analysis.*—Calcd. for $C_{16}H_{44}Si_4Pb$; Pb, 37.26. Found: Pb, 37.40.

EXAMPLE III

Di[tris(trimethylsilylmethyl)plumbyl]methane

Tris(trimethylsilylmethyl)plumbylmagnesium chloride was prepared as described in Example I from 27.8 g. (0.1 m) of lead chloride in 500 ml. of THF at 5° C. To the solution was added 8.0 ml. of methylene dichloride. The mixture was warmed to ambient temperature and stirred for 30 minutes and heated to 50° C. for 20 minutes. The reddish-brown color disappeared and a gelatinous precipitate was formed. The reaction mixture was hydrolyzed with 400 ml. of water and the THF was removed by distillation. The heavy oily product was separated from the aqueous phase and washed several times with water. The volatile impurities were removed by steam distillation. The light yellow oil was then crystallized from a mixture of acetone and chloroform (50%) at −10° C.; 42.5 g. (80%) of white crystalline solid melting at 39–42° was obtained.

*Analysis.*—Calcd. for $C_{25}H_{68}Si_6Pb_2$; Pb, 43.59. Found: Pb, 43.44.

EXAMPLE IV

Tris(trimethylsilylmethyl)methyllead

Tris(trimethylsilylmethyl)plumbylmagnesium chloride was prepared as described in Example I from 27.8 g. (0.1 mole) of lead chloride and 0.30 mole of trimethylsilylmethylmagnesium chloride in 500 ml. of THF at 5° C. Into the solution was condensed 25 ml. of methyl chloride. The reddish-brown color disappeared immediately. The solution was warmed to ambient temperature and hydrolyzed with 400 ml. of water. The THF was removed by distillation at atmospheric pressure. The heavy product was separated from the aqueous layer and washed several times with water. The cloudy liquid was then vacuum distilled, and the fraction boiling at 87–88° C. (0.3 mm.) was collected and weighed; 45.0 g. (93%) of product was obtained.

*Analysis.*—Calcd. for $C_{13}H_{36}Si_3Pb$; Pb, 42.82. Found: Pb, 42.79.

EXAMPLE V

Tris(trimethylsilylmethyl)ethyllead

Tris(trimethylsilylmethyl)plumbylmagnesium chloride was prepared as described in Example I from 27.8 g. (0.1 mole) of lead chloride in 500 ml. of THF at 5° C. Into the solution was condensed 35 ml. of ethyl chloride. The solution was then warmed to ambient temperature for ten minutes and to 55° C. for 15 minutes. The characteristic color of the complex disappeared and a gelatinous precipitate was formed. The mixture was hydrolyzed with 400 ml. of water and the THF was removed by distillation at atmospheric pressure. The heavy organic phase was then extracted into petroleum ether (B.P. 37–54° C.) for easier handling. The petroleum ether was evaporated and the oily product was vacuum distilled. The colorless liquid boiling at 97–99° C. (0.7 mm.) was collected.

*Analysis.*—Calcd. for $C_{14}H_{38}Si_3Pb$; Pb, 41.61. Found: Pb, 41.42.

EXAMPLE VI

Reaction of tris(trimethylsilylmethyl)plumbylmagnesium chloride with chloroform and carbon tetrachloride Tris(trimethylsilylmethyl)plumbylmagnesium chloride (0.1 m) was prepared as described in Example I in 500 ml. of THF. In separate runs, 4.0 g. (0.026 m) of carbon tetrachloride and 6.0 ml. (approximately 0.075 m) of chloroform were added over a 15-minute period respectively. The reaction mixture was warmed to room temperature and stirred for 15 minutes and then to 50° C. and stirred for one hour. The mixture was hydrolyzed with water, and the THF was removed by distillation. After cooling, the aqueous solution was extracted with petroleum ether. A white precipitate which collected in the ether layer was produced in both experiments. The petroleum ether was filtered and the white gelatinous precipitate recovered. Recrystallization of the white solid from toluene gave crystals which melted at 213–215° C. Approximately 4–6 g. of the white solid was obtained in the $CCl_4$ and $HCCl_3$ reactions. It was identified as

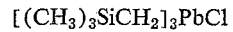
$[(CH_3)_3SiCH_2]_3PbCl$

*Analysis.*—Calcd. for $C_{12}H_{33}Si_3PbCl$; Pb, 41.08, Cl, 7.03. Found: Pb, 39.98, Cl, 6.88%.

Evaporation of the petroleum ether gave several grams of tetrakis(trimethylsilylmethyl)lead (≈50% yield) in both runs.

Organolead-silicon compounds are useful as antiknock agents or additives to hydrocarbon fuels, particularly in gasoline to be burned in internal combustion engines.

The foregoing disclosure and description of the invention is illustrative and explanatory thereof and various changes may be made within the scope of the appended claims without departing from the spirit of the invention.

What is claimed is:

1. A method of preparing an alkyllead-silicon compound, comprising the steps of: reacting a lower alkyl silicon Grignard reagent with a compound selected from the group consisting of a lead halide or a lead carboxylate in the presence of a solvent selected from the group consisting of an ether more basic than diethyl ether, a lower alkyl amine or hexamethyl phosphoramide, thereby forming a complex alkylsilylplumbyl halide intermediate; and subsequently reacting the complex intermediate with an alkyl halide in the presence of the solvent, thereby producing the alkyllead-silicon compound.

2. The method of claim 1, wherein the reactions are carried out at a temperature of about 5° C.

3. The method of claim 1, wherein the reactions are carried out at a temperature of from about −20° C. to about 5° C.

4. The method of claim 1, wherein the solvent is a compound selected from the group consisting of alkyl ethers, cyclic ethers, and glycolic ethers.

5. The method of claim 1, wherein the solvent is trimethyl amine or triethyl amine.

6. The method of claim 1, wherein the solvent is tetrahydrofuran.

7. The method of claim 1, wherein the solvent is hexamethylphosphoramide.

8. A method of making an organolead-silicon compound as represented by the following equations:

(a)
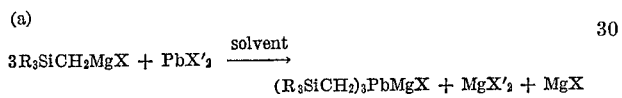

(b)
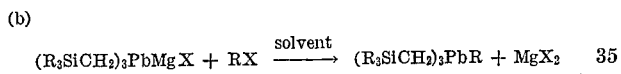

wherein

R=alkyl group, or aryl group
X=Halogen
X′=Halogen or carboxylate

9. The method of claim 8, wherein the solvent is tetrahydrofuran.

10. The method of claim 8, wherein the solvent is an ether more basic than diethyl ether.

11. The method of claim 8, wherein the solvent is selected from the group consisting of alkyl ethers, cyclic ethers and glycolic ethers.

12. The method of claim 8, wherein the solvent is a cycloalkylene mono-ether having the following formula:

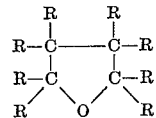

wherein, R=hydrogen, an alkyl group having from 1–10 carbon atoms, or an aryl group.

13. The method of claim 8, wherein the solvent is an amine.

14. The method of claim 8, wherein the solvent is hexamethylphosphoramide.

15. The method of claim 8, wherein the reactions are carried out at a temperature of about 5° C.

16. The method of claim 8, wherein the reactions are carried out at a temperature of from about −20° C. to about 5° C.

17. A method of preparing an organolead-silicon compound comprising the steps of: reacting three moles of an alkyl or aryl silicon magnesium chloride (Grignard reagent) with one mole of a lead chloride or lead carboxylate in a tetrahydrofuran solution at about 5° C., thereby forming a complex silylplumbylmagnesium chloride; and then reacting the complex silylplumbylmagnesium chloride with an alkyl or aryl chloride in a tetrahydrofuran solution at a temperature of about 5° C., thereby forming the organolead-silicon compound.

References Cited

UNITED STATES PATENTS 3,444,223   5/1969   Gorsich ---------- 260—437 R
3,488,369   1/1970   Williams ---------- 260—437 R
3,539,608   11/1970  Psarras et al. -------- 260—437 R

OTHER REFERENCES

Seyferth et al., J. Org. Chem. vol. 26, p. 2605 (1961).
Gilman et al., J. Amer. Chem. Soc. vol. 61, pp. 731–8 (1939).
Schmidbaur, Chem. Ber. vol. 97, pp. 270–281 (1964).
Normant, Angew. Chem. Internat. Edit., vol. 6, No. 12, pp. 1046, 1048–49 (1967).

JAMES E. POER, Primary Examiner

H. M. S. SNEED, Assistant Examiner